(12) United States Patent
Chen et al.

(10) Patent No.: US 11,537,843 B2
(45) Date of Patent: Dec. 27, 2022

(54) DATA SHARING SYSTEM AND DATA SHARING METHOD THEREFOR

(71) Applicant: Shanghai Cambricon Information Technology Co., Ltd, Pudong New Area (CN)

(72) Inventors: Tianshi Chen, Pudong New Area (CN); Shuai Hu, Pudong New Area (CN); Yifan Hao, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 501 days.

(21) Appl. No.: 16/693,956

(22) Filed: Nov. 25, 2019

(65) Prior Publication Data
US 2020/0090024 A1 Mar. 19, 2020

Related U.S. Application Data

(63) Continuation of application No. 16/693,918, filed on Nov. 25, 2019, now Pat. No. 10,901,815, which is a (Continued)

(30) Foreign Application Priority Data

Jun. 29, 2017 (CN) .......................... 201710515517.8

(51) Int. Cl.
*G06N 3/04* (2006.01)
*G06F 9/30* (2018.01)
(Continued)

(52) U.S. Cl.
CPC ........... *G06N 3/04* (2013.01); *G06F 9/30145* (2013.01); *G06F 12/0875* (2013.01);
(Continued)

(58) Field of Classification Search
CPC .............. G10H 1/40; G10H 1/00; G10G 1/00
See application file for complete search history.

(56) References Cited

U.S. PATENT DOCUMENTS

2007/0226718 A1 9/2007 Watanabe
2009/0265500 A1 10/2009 Kyusojin
(Continued)

FOREIGN PATENT DOCUMENTS

CN 1200513 A 12/1998
CN 1522402 A 8/2004
(Continued)

OTHER PUBLICATIONS

EP18824582.3, Response to Extended European Search Report dated Aug. 20, 2020, dated Feb. 18, 2021, 13 pages.
(Continued)

*Primary Examiner* — Getente A Yimer
(74) *Attorney, Agent, or Firm* — Getech Law LLC; Jun Ye

(57) ABSTRACT

The application provides an information processing device, system and method. The information processing device mainly includes a storage module and a data processing module, where the storage module is configured to receive and store input data, instruction and output data, and the input data includes one or more key features; the data processing module is configured to identify the key features included in the input data and score the input data in the storage module according to a judgment result. The information processing device, system and method provided by the application automatically scores text, pictures, audio, video, and the like instead of manually scoring, which is more accurate and faster.

18 Claims, 4 Drawing Sheets

Related U.S. Application Data continuation-in-part of application No. PCT/CN2018/092829, filed on Jun. 26, 2018.

(51) Int. Cl.

| | | |
|---|---|---|
| *G06F 12/0875* | (2016.01) | |
| *G06F 13/28* | (2006.01) | |
| *G06N 3/063* | (2006.01) | |
| *G06N 3/08* | (2006.01) | |
| *G06Q 10/06* | (2012.01) | |
| *G06V 20/40* | (2022.01) | |
| *G06V 30/40* | (2022.01) | |
| *G10L 15/26* | (2006.01) | |
| *G06V 30/10* | (2022.01) | |

(52) U.S. Cl.
CPC ............ *G06F 13/28* (2013.01); *G06N 3/063* (2013.01); *G06F 2212/452* (2013.01)

(56) References Cited

U.S. PATENT DOCUMENTS

| | | | |
|---|---|---|---|
| 2012/0131283 A1 | 5/2012 | Mital et al. | |
| 2014/0093184 A1* | 4/2014 | Wang | H04N 1/00167 382/254 |
| 2014/0297628 A1* | 10/2014 | Tsuji | G06F 16/3346 707/723 |
| 2015/0156176 A1* | 6/2015 | Collinge | H04L 63/062 713/168 |
| 2016/0103743 A1 | 4/2016 | Sanghi et al. | |
| 2016/0179434 A1 | 6/2016 | Herrero Abellanas et al. | |
| 2017/0256246 A1* | 9/2017 | Maezawa | G10G 1/00 |
| 2018/0109630 A1* | 4/2018 | Matsuda | H04L 67/561 |

FOREIGN PATENT DOCUMENTS

| | | |
|---|---|---|
| CN | 1702858 A | 11/2005 |
| CN | 101739867 A | 6/2010 |
| CN | 101980149 A | 2/2011 |
| CN | 102184157 A | 9/2011 |
| CN | 102741828 A | 10/2012 |
| CN | 102831011 A | 12/2012 |
| CN | 102866912 A | 1/2013 |
| CN | 102930866 A | 2/2013 |
| CN | 103019656 A | 4/2013 |
| CN | 103177733 A | 6/2013 |
| CN | 103347037 A | 10/2013 |
| CN | 103928023 A | 7/2014 |
| CN | 104021042 A | 9/2014 |
| CN | 104268603 A | 1/2015 |
| CN | 104281540 A | 1/2015 |
| CN | 104463101 A | 3/2015 |
| CN | 104464423 A | 3/2015 |
| CN | 104978971 A | 10/2015 |
| CN | 105159762 A | 12/2015 |
| CN | 105512723 A | 4/2016 |
| CN | 105793830 A | 7/2016 |
| CN | 106062786 A | 10/2016 |
| CN | 106407145 A | 2/2017 |
| CN | 106502806 A | 3/2017 |
| CN | 106781784 A | 5/2017 |
| CN | 106897248 A | 6/2017 |
| CN | 106909971 A | 6/2017 |
| CN | 107590531 A | 1/2018 |
| CN | 107832768 A | 3/2018 |
| CN | 107992329 A | 5/2018 |
| WO | 2015042904 A1 | 4/2015 |

OTHER PUBLICATIONS

EP18824582.3, Response to the Invitation to File a Search Results Pursuant to Rule 70b(1) EPC dated Mar. 1, 2021, filed Mar. 4, 2021, 16 pages.
CN201810407185.6, Office Action, dated May 2, 2021, 10 pages. (No English Translation).
CN201710515517.8—Office Action dated Jul. 31, 2020, 13 pages. (No English Translation).
Li Hong, The application of BP Neural Network in Image Correcting Work Based on Matlab Platform, Journal of Langfang Teachers College (Natural Science Edition), vol. 15 No. 1, Feb. 2015, 4 pages.
CN201710497394.X—Office Action, dated May 8, 2020, 11 pages (No English Translation).
CN201710497394.X—Second Office Action, dated Dec. 18, 2020, 8 pages (No English Translation).
Yu Zijian, et al., "FPGA-Based Accelerator for Convolutional Neural Network", Computer Engineering, 2017, 7 pages.
Shi Jin Zhang, et. al., "Cambricon-X: An Accelerator for Sparse Neural Networks", IEEE, 2016, 12 pages.
Shaoli Liu, et al., "Cambricon: An Instruction Set Architecture for Neural Networks", ACM/IEEE, 2016, 13 pages.
CN201710721049.X, Office Action, dated Apr. 23, 2020, 12 pages. (No English Translation).
CN201710721049.X, Second Office Action, dated Nov. 24, 2020, 8 pages. (No English Translation).
CN201810407185.6, Office Action, dated May 27, 2020, 11 pages. (No English Translation).
Shun-Wen Cheng, "Configurable CMOS H-tree Logic Module", Dept. of Electronic Engineering, Far East University, IEEE, 2009, 4 pages.
PCT/CN2018092829, EP18824582.3, Extended European Search Report, dated Aug. 3, 2020, 9 pages.
PCT/CN2018092829, Search Report, dated Sep. 17, 2018, 10 pages. (No English Translation).
CN201710515517.8—Office Action, dated Feb. 23, 2022, 23 pages.
CN201810467383.1—Office Action, dated Aug. 27, 2021, 21 pages.
CN201810641721.9—Office Action, dated Oct. 9, 2021, 13 pages.
Goodfellow et al., "Generative Adversarial Nets", Jun. 10, 2014, 9 pages.

\* cited by examiner

DATA SHARING SYSTEM AND DATA SHARING METHOD THEREFOR

TECHNICAL FIELD

The disclosure relates to the field of information processing, and particularly to an information processing device, system and method.

BACKGROUND

Artificial neural networks have achieved wide success in the fields of image processing, mode recognition, prediction and inference, economy, etc., and can adapt to the corresponding work situation through self-learning, therefore, it promotes the development of artificial intelligence in daily life. At present, the scoring of test papers, homework, martial arts, and setting-up exercises during the break are all done manually. Manually scoring homework or test papers is subjective, low precision, and has no uniform standard, so that different teachers have different scores on the same homework or test paper. In addition, manually scoring homework will delay teachers' time. On the contrary, artificial neural network can save time and perform scoring according to the corresponding operation, which can avoid the problem of strong subjectivity and low precision. If manually scoring martial arts or setting-up exercises during the break, there will be non-standard actions, so that the teachers need real-time guidance. Using the artificial intelligence scoring action, the camera or other image capture devices can capture the action map, give a judgment result or score, and feed back to the action implementer to make timely adjustments to achieve the standard action, which can save time and effort.

Manually scoring is subjective, low precision, time and effort consuming.

SUMMARY

The disclosure provides an information processing device, system and method, so as to solve the above technical problems.

An aspect of the disclosure provides an information processing device, which may include a storage module configured to receive and store input data and one or more instructions; and a data processing module configured to identify one or more key features included in the input data to generate a judgment result, and score the input data in the storage module according to the judgment result. The input data may be original input data or preprocessed data obtained by preprocessing the original input data.

In some embodiments, the data processing module may be configured to compute confidence of the key features included in the input data, and wherein the confidence is the judgment result.

In some embodiments, the storage module stores data and one or more instructions. The data may include the input data, input neurons, weights, output neurons. The input data may be transmitted to each input node in an artificial neural network for subsequent computation Values of the output neurons may include the judgment result and a score. The judgment result and the score may be determined as output data.

In some embodiments, the data processing module may include a computation module configured to perform corresponding computation on the data stored in the storage module according to the one or more instructions stored in the storage module and output a computational result to the storage module. In each layer of the neural network, the computation module may include one or more multipliers configured to multiply the input data with the weights; one or more adders configured to add one or more multiplication results to generate an addition result, and determine whether to add a bias value to the addition result; and an activation function unit configured to perform an activation function to the addition result to generate the output neurons.

In some embodiments, the data processing module may further include an instruction cache configured to cache the one or more instructions; and a neural network data cache configured to cache the weights, the input neurons and the output neurons.

In some embodiments, the data processing module may further include a Direct Memory Access (DMA) serving as a bridge which connects the storage module with each cache and configured to access the data and instruction stored in the storage module, store a read-out/written-out instruction into the instruction cache, store read-out weights into the weight cache, store the input data in the input neuron cache, and store the judgment result and/or the score received from the output neuron cache into the storage module. The data processing module may further include a controlling unit configured to read the instruction from the instruction cache, decode the instruction into an instruction executable for the computation module, and output the instruction to the computation module.

In some embodiments, the data processing module may further include a scoring unit configured to obtain the score according to the judgment result if the artificial neural network running in the information processing device obtains no score but only the judgment result.

In some embodiments, the judgment results may be values of output neurons of a final output layer of the artificial neural network running in the information processing device, the value of the output neuron is the confidence that the key features appear, and the confidence is a natural number within a certain range.

In some embodiments, the score may be obtained by adding a layer after the final output layer of the artificial neural network running in the information processing device as a new final output layer, where the values of input neurons of the new final output layer are confidences that the key features appear, and the new final output layer has only one output neuron, the value of the output neuron is the score; where weights in computation of the new final output layer correspond to importance degrees of each key feature, if the layer has N+1 output neurons, a value range of the score is [0, N], if the output neurons of the layer are numbered to be 0, 1, 2, . . . , N, a value of the $i^{th}$ output neuron is confidence $P_i$ corresponding to a score value i, and the value of a final score corresponds to the highest confidence, in other words, the score=$i_0$, $P_{i_0}$=max $\{P_i|i=0, 1, \ldots, N\}$.

In some embodiments, the score may be obtained by taking the confidence that each key feature appears as input of the scoring unit, after each key feature is obtained in the final output layer of the artificial neural network running in the information processing device, and obtaining, by the scoring unit, the score accordingly.

The disclosure may further include a method for information processing. The method may include receiving, by a storage module, input data and one or more instructions; and identifying, by a data processing module, one or more key features included in the input data to generate a judgment result, and scoring, by the data processing module, the input data in the storage module according to the judgment result.

The method may further include computing, by the data processing module, confidence of the key features included in the input data, and wherein the confidence is the judgment result.

The method may further include storing, by the storage module, data and one or more instructions, wherein the data includes the input data, input neurons, weights, output neurons transmitting the input data to each input node in an artificial neural network for subsequent computation, wherein values of the output neurons include the judgment result and a score, wherein the judgment result and the score are determined as output data.

The method may further include performing, by a computation module of the data processing module, corresponding computation on the data stored in the storage module according to the one or more instructions stored in the storage module and output a computational result to the storage module multiplying, by one or more multiplier of the computation module, the input data with the weights; adding, by one or more adders of the computation module, one or more multiplication results to generate an addition result; determining, by the one or more adders, whether to add a bias value to the addition result; and performing, by an activation function unit of the computation module, an activation function to the addition result to generate the output neurons.

The method may further include caching, by an instruction cache, the one or more instructions; and caching, by a neural network data cache, the weights, the input neurons and the output neurons.

The method may further include accessing, by a Direct Memory Access (DMA) serving as a bridge which connects the storage module with each cache, the data and instruction stored in the storage module; storing, by the DMA, a read-out/written-out instruction into the instruction cache; storing, by the DMA, read-out weights into the weight cache; storing, by the DMA, the input data in the input neuron cache; storing, by the DMA, the judgment result and/or the score received from the output neuron cache into the storage module; reading, by a controlling unit, the instruction from the instruction cache; decoding, by the controlling unit, the instruction into an instruction executable for the computation module; and outputting, by the controlling unit, the instruction to the computation module.

The method may further include obtaining, by a scoring unit, the score according to the judgment result if the artificial neural network running in the information processing device obtains no score but only the judgment result.

The method may further include adding a layer after the final output layer of the artificial neural network running in the information processing device as a new final output layer, where the values of input neurons of the new final output layer are confidences that the key features appear, and the new final output layer has only one output neuron, the value of the output neuron is the score; where weights in computation of the new final output layer correspond to importance degrees of each key feature, if the layer has N+1 output neurons, a value range of the score is [0, N], if the output neurons of the layer are numbered to be 0, 1, 2, . . . , N a value of the $i^{th}$ output neuron is confidence $P_i$ corresponding to a score value i, and the value of a final score corresponds to the highest confidence, in other words, the score=$i_0$, $P_{i_0}$=max $\{P_i | i=0, 1, \ldots, N\}$.

The method may further include taking the confidence that each key feature appears as input of the scoring unit, after each key feature is obtained in the final output layer of the artificial neural network running in the information processing device, and obtaining, by the scoring unit, the score accordingly.

In the solution, the input data is original input data or data obtained by preprocessing the original input data.

In the solution, the data processing module identifying the key features included in the input data may include: the data processing module computing confidence of the key features included in the input data, in which the confidence may be the judgment result.

In the solution, data and an instruction may be stored in the storage module, and the data may include input data, input neurons, weights, output neurons and output data. The input data may be transmitted to each input node in an artificial neural network, thereby participating in subsequent computation. Value of the output neuron, in other words, the judgment result and a score, may be taken as the output data.

In the solution, the data processing module may include a computation module configured to perform corresponding computation on the data stored in the storage module according to the instruction stored in the storage module and output a computational result to the storage module.

In the solution, the computation module may be configured to perform the corresponding computation on the data stored in the storage module according to the instruction stored in the storage module, and in each layer of the neural network, the computation module may include a first part including a multiplier, a second part including one or more adders, a third part including an activation function unit, and a fourth part including a vector processing unit. In the solution, the second part may include multiple adders, and the multiple adders form an adder tree.

In the solution, activation functions may be sigmoid, tan h, relu or softmax.

In the solution, the fourth part may include the vector processing unit, and the vector processing unit may perform pooling computation.

In the solution, the data processing module may further include an instruction cache and a neural network data cache. The instruction cache may be configured to cache the instruction, and the neural network data cache may be configured to cache weight data, input neurons and output neurons in the storage module.

In the solution, the neural network data cache may include a weight cache, an input neuron cache and an output neuron cache. The weight cache may be configured to cache the weight data; the input neuron cache may be configured to cache the input neurons; and the output neuron cache may be configured to cache and output the computational result, in other words, the judgment result and/or the score, output by the computation module.

In the solution, the data processing module may further include a Direct Memory Access (DMA), and the DMA may serve as a bridge connecting the storage module with each cache and may be configured to read/write the data and/or instruction stored in the storage module, store the read-out/written-out instruction into the instruction cache, store the read-out weights into the weight cache, store the read-out input neurons, in other words, the input data, into the input neuron cache and store the output neurons, in other words, the judgment result and/or the score received from the output neuron cache into the storage module.

In the solution, the data processing module may further include a controlling unit, and the controlling unit may be configured to read the instruction from the instruction cache, decode it into an instruction executable for the computation module and output it to the computation module.

In the solution, the data processing module may further include a scoring unit, and the scoring unit may be configured as follows. If the artificial neural network running in the information processing device obtains the judgment result and further obtains the score, the scoring unit does not participate in data processing, and if the artificial neural network running in the information processing device obtains no score but only the judgment result, the scoring unit may be configured to obtain the score according to the judgment result.

In the solution, the judgment result may be value of output neurons of a final output layer of the artificial neural network running in the information processing device, the value of the output neuron may be the confidence that the key features appear, and the confidence may be a natural number within a certain range. The score may be obtained as follows. A layer may be added after the final output layer of the artificial neural network running in the information processing device as a new final output layer. Value of input neurons of the new final output layer may be confidences that the key features appear. The new final output layer may have only one output neuron, the value of the output neuron may be the score and weights in computation of the new final output layer correspond to importance degrees of each key feature. If the layer has N+1 output neurons, a value range of the score is [0, N]. If the output neurons of the layer are numbered to be 0, 1, 2, . . . , N, a value of the $i^{th}$ output neuron may be confidence $P_i$ corresponding to a score value i, and the value of a final score may correspond to the highest confidence, in other words, the score=$i_0$, $P_{i_0}$=max $\{P_i | i=0, 1, \ldots, N\}$.

In the solution, the score may be obtained as follows. After being obtained in the final output layer of the artificial neural network running in the information processing device, the confidence that each key feature appears may be taken as input of the scoring unit, and the scoring unit accordingly obtains the score.

In the solution, the information processing device may be an artificial neural network chip.

Another aspect of the disclosure provides an information processing method, for which an information processing device is adopted, the method including the follows.

A storage module may receive and store input data, an instruction and output data, and the input data may include one or more key features. A data processing module may identify the key features included in the input data and score the input data in the storage module according to a judgment result.

In the solution, the input data is original input data or data obtained by preprocessing the original input data.

In the solution, the data processing module identifying the key features included in the input data may include: the data processing module computing confidence of the key features included in the input data, in which the confidence may be the judgment result.

In the solution, the storage module may store data and an instruction, and the data may include input data, input neurons, weights, output neurons and output data. The input data may be transmitted to each input node in an artificial neural network, thereby participating in subsequent computation. Value of the output neuron, in other words, the judgment result and a score, may be taken as the output data.

In the solution, the data processing module may include a computation module, and the computation module may perform corresponding computation on the data stored in the storage module according to the instruction stored in the storage module and output a computational result to the storage module.

In the solution, the computation module may perform the corresponding computation on the data stored in the storage module according to the instruction stored in the storage module, and in each layer of the neural network, the computation module may include: a first part including a multiplier, a second part including one or more adders, a third part including an activation function unit and a fourth part including a vector processing unit.

In the solution, the second part may include multiple adders, the multiple adders form an adder tree.

In the solution, activation functions may be sigmoid, tan h, relu or softmax.

In the solution, the fourth part may include the vector processing unit, and the vector processing unit may perform pooling computation.

In the solution, the data processing module may further include an instruction cache and a neural network data cache. The instruction cache may be configured to cache the instruction. The neural network data cache may be configured to cache weight data, input neurons and output neurons in the storage module.

In the solution, the neural network data cache may include a weight cache, an input neuron cache and an output neuron cache. The weight cache may be configured to cache the weight data. The input neuron cache may be configured to cache the input neurons. The output neuron cache may be configured to cache and output the computational result, in other words, the judgment result and/or the score, output by the computation module.

In the solution, the data processing module may further include a DMA, and the DMA may serve as a bridge connecting the storage module with each cache, read/write the data and/or instruction stored in the storage module, store the read-out/written-out instruction into the instruction cache, store the read-out weights into the weight cache, store the read-out input neurons, in other words, the input data, into the input neuron cache and store the output neurons, in other words, the judgment result and/or the score, received from the output neuron cache into the storage module.

In the solution, the data processing module may further include a controlling unit, and the controlling unit may read the instruction from the instruction cache, decode it into an instruction executable for the computation module and output it to the computation module.

In the solution, the data processing module may further include a scoring unit, and if the artificial neural network running in the information processing device obtains the judgment result and further obtains the score, the scoring unit does not participate in data processing. If the artificial neural network running in the information processing device obtains no score but only the judgment result, the scoring unit obtains the score according to the judgment result.

In the solution, the judgment result may include value of output neurons of a final output layer of the artificial neural network running in the information processing device, the value of the output neuron may be the confidence that the key features appear, and the confidence may be a natural number within a certain range. The score may be obtained as follows. A layer may be added after the final output layer of the artificial neural network running in the information processing device as a new final output layer. Value of input neurons of the new final output layer may be confidences that key features appear. The new final output layer has only one output neuron, the value of the output neuron is the score and weights in computation of the new final output layer correspond to importance degrees of each key feature. If the layer has N+1 output neurons, a value range of the score is [0, N]. If the output neurons of the layer are numbered to be 0, 1, 2, ..., N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i | i=0, 1, ..., N\}$.

In the solution, the score may be obtained as follows. After being obtained in the final output layer of the artificial neural network running in the information processing device, the confidence of appearance of each key feature may be taken as input of the scoring unit, and the scoring unit accordingly obtains the score.

In the solution, the information processing device adopted for the information processing method is an artificial neural network chip.

Another aspect of the disclosure further provides an information processing system, which may include an information acquisition device, an information processing device, an interaction interface and a controlling device.

The information acquisition device may be configured to acquire external data and transmit the external data to the information processing device.

The information processing device may be configured to perform computational processing on the external data received from the information acquisition device and output a computational processing result to the interaction interface.

The interaction interface may be configured to display the computational result received from the information processing device and transmit an externally received operation or command to the controlling device.

The controlling device may be configured to control operations of the information acquisition device, the information processing device and the interaction interface according to the operation or command received from the interaction interface.

In the solution, the information acquisition device may include a character recognition device, an image recognition device and a voice recognition device.

The character recognition device may be configured to acquire text information in the external data.

The image recognition device may be configured to acquire picture or video information in the external data.

The voice recognition device may be configured to acquire audio information in the external data.

In the solution, the interaction interface may be a display screen of a mobile phone, a computer, a notebook computer or a tablet computer.

Another aspect of the disclosure further provides an information processing method, for which an information processing system is adopted, and the method may include the follows.

The information acquisition device may acquire external data and transmit the external data to an information processing device directly or after preprocessing.

The information processing device may perform computational processing on the external data or the external data preprocessed received from the information acquisition device and output a computational processing result to the interaction interface.

The interaction interface may display the computational result received from the information processing device.

In the solution, the information acquisition device may include a character recognition device, an image recognition device and a voice recognition device, and the information acquisition device acquiring the external data may include the follows.

The information acquisition device may adopt the character recognition device to acquire text information in the external data.

The information acquisition device may adopt the image recognition device to acquire picture or video information in the external data.

The information acquisition device may adopt the voice recognition device to acquire audio information in the external data.

The processing device, system and method provided by the application at least have the following advantages.

1. The processing device, system and method provided by the application adopt the artificial neural network chip to automatically score a handwriting, a text and a picture instead of a worker, which is more accurate and faster than manual scoring. A subjective question may be evaluated more objectively, and influence of hobbies of a person and influence of a handwriting level of a testee are avoided.

2. According to the processing device, system and method provided by the application, the movements/postures of the user are monitored instantly, a prompt is automatically and instantly given to regulate the movements/postures of the user, and the method and the device work for training and monitoring instead of the worker, and are more accurate and instant than the worker.

3. According to the processing device, system and method provided by the application, the artificial neural network chip is of powerful computation capability, supports offline running of the neural network and may work for automatic scoring monitoring without assistance of a cloud server in computation if a user terminal/front end is offline. If the chip is online and assisted by the cloud server for computation, the computation capability of the chip is more powerful.

4. According to the processing device, system and method provided by the application, the artificial neural network chip may perform adaptive training, and the artificial neural network chip accumulates data of a user for self-learning and may be gradually adapted to, for example, handwritings, habitual writing errors, postural characteristics and habitual movements of the user to constantly improve the accuracy and improve a movement/posture regulation capability for the user.

5. According to the processing device, system and method provided by the application, in the artificial neural network chip, the dedicated on-chip caches (for example, the instruction cache, the input neuron cache, an output neuron cache and the weight cache) and a dedicated artificial neural network computational instruction and a memory access instruction are adopted, so that computational and memory access efficiency may be effectively improved.

6. According to the processing device, system and method provided by the application, in the artificial neural network chip, multiple groups of weights and input neurons may be concurrently processed by the adder tree computation adopted by the computation module, so that the computational efficiency can be improved.

7. According to the processing device, system and method provided by the application, after the external data is preprocessed, the external data may be more suitable to be processed by an artificial neural network to remove noise and redundancy in the input data and improve classification and recognition accuracy and the like.

DETAILED DESCRIPTION OF THE EMBODIMENTS

Figure 1:
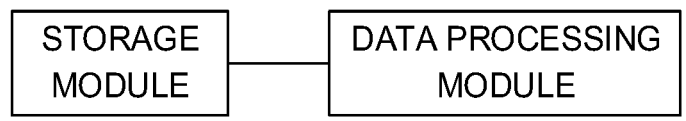
FIG. 1 is a structure diagram of an information processing device according to an embodiment of the disclosure.

FIG. 1 is a structure diagram of an information processing device according to an embodiment of the disclosure. The device may include a storage module and a data processing module. The storage module may be configured to receive and store input data, an instruction and output data. The input data may include one or more key features, and the input data is original input data or data obtained by preprocessing the original input data. The data processing module may be configured to identify the key features included in the input data, in other words, the data processing module computes confidence of the key features included in the input data, the confidence being a judgment result, and score the input data in the storage module according to the judgment result.

In the solution, data and an instruction are stored in the storage module, and the data may include input data, input neurons, weights, output neurons and output data. The input data is transmitted to each input node in an artificial neural network, thereby participating in subsequent computation, and the value of the output neuron, in other words, the judgment result and/or a score, are taken as the output data.

Figure 2:
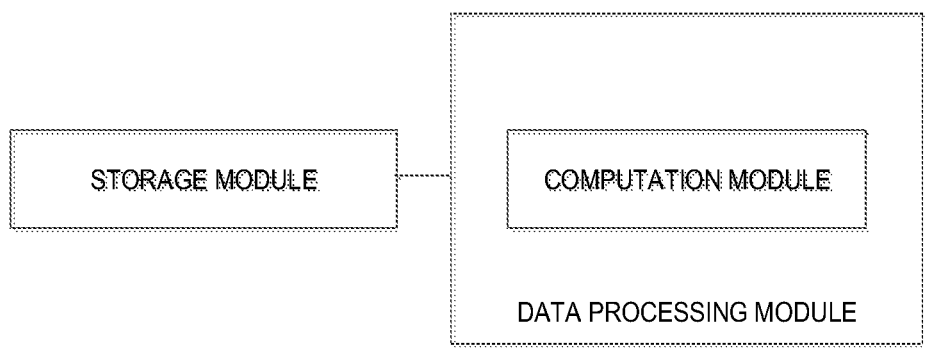
FIG. 2 is a structure diagram of an information processing device including a computation module according to an embodiment of the disclosure.

FIG. 2 is a structure diagram of an information processing device including a computation module according to an embodiment of the disclosure. The data processing module may include the computation module configured to perform corresponding computation on the data stored in the storage module according to the instruction stored in the storage module and output a computational result to the storage module.

Computation performed by the computation module may include neural network computation, and the computation module may include, but is not limited to a first part including a multiplier, a second part including one or more adders (more specifically, the adders of the second part form an adder tree), a third part including an activation function unit, and/or a fourth part including a vector processing unit. More specifically, the vector processing unit may process vector computation and/or pooling computation. The first part multiplies input data 1 (in1) and input data 2 (in2) to obtain multiplied output (out), and a process is represented with out=in1×in2. The second part adds the input data in1 through the adders to obtain output data (out). More specifically, if the second part is the adder tree, the input data in1 is added step by step through the adder tree to obtain the output data (out). Data in1 is a vector with a length N, N is greater than 1, and a process is represented with out=in1[1]+in1[2]+ . . . +in1[N], and/or the input data 1 (in1) is accumulated through the adder tree and then is added with the input data 2 (in2) to obtain the output data (out), A process is represented with out in1[1]+in1[2]+ . . . +in1[N]+in2, or the input data 1 (in1) and the input data 2 (in2) are added to obtain the output data (out), and a process is represented with out=in1+in2. The third part may perform computation on the input data (in) through an activation function to obtain active output data (out), and a process is represented with out=active(in), and the activation function may be sigmoid, tan h, relu, softmax and the like. Besides an activation operation, the third part may implement another nonlinear function and may perform computation (f) on the input data (in) to obtain the output data (out), and a process is represented with out=f(in). The vector processing unit may perform the pooling computation on the input data (in) to obtain output data (out) after a pooling operation, and a process is represented with out=pool(in), in which pool may be the pooling operation, and the pooling operation may include, but is not limited to AVGPOOLING, MAXPOOLING and median pooling. The input data (in) is data in a pooling core related to output out. The computation of one or more parts of the above-mentioned parts may be freely selected for combination in different sequences, thereby implementing computation of various functions.

Figure 3:
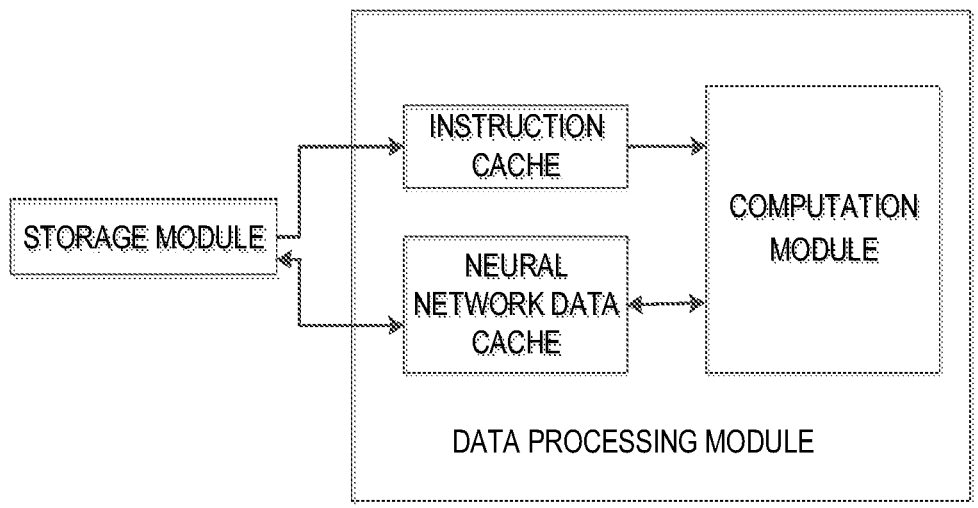
FIG. 3 is a structure diagram of an information processing device including an instruction cache and a neural network data cache according to an embodiment of the disclosure.

FIG. 3 is a structure diagram of an information processing device including an instruction cache and a neural network data cache according to an embodiment of the disclosure. As illustrated in FIG. 3, the data processing module of the information processing device may further include the instruction cache and the neural network data cache. The instruction cache may be configured to cache an instruction, and the neural network data cache may be configured to cache weight data, input neurons and output neurons in the storage module.

Figure 4:
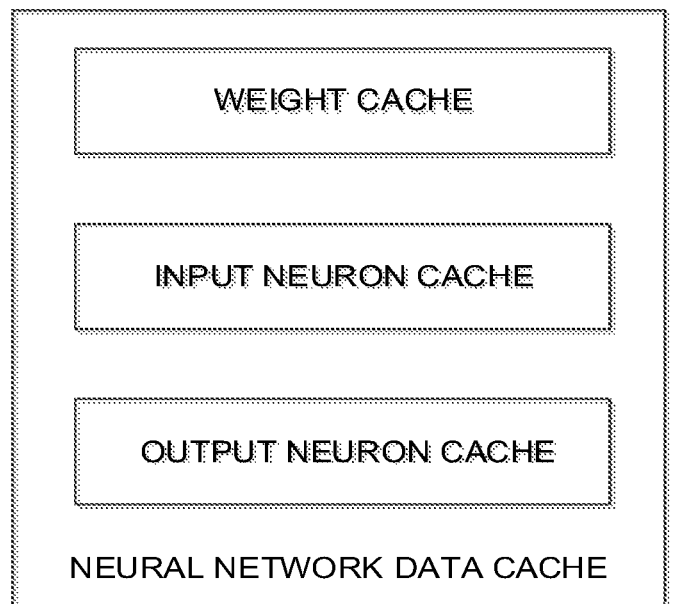
FIG. 4 is a structure diagram of a neural network data cache according to an embodiment of the disclosure.

FIG. 4 is a structure diagram of a neural network data cache according to an embodiment of the disclosure. As illustrated in FIG. 4, the neural network data cache may include a weight cache, an input neuron cache and an output neuron cache. The instruction cache may be configured to cache the instruction, and the neural network data cache may be configured to cache the weight data, input neurons and output neurons in the storage module.

Figure 5:
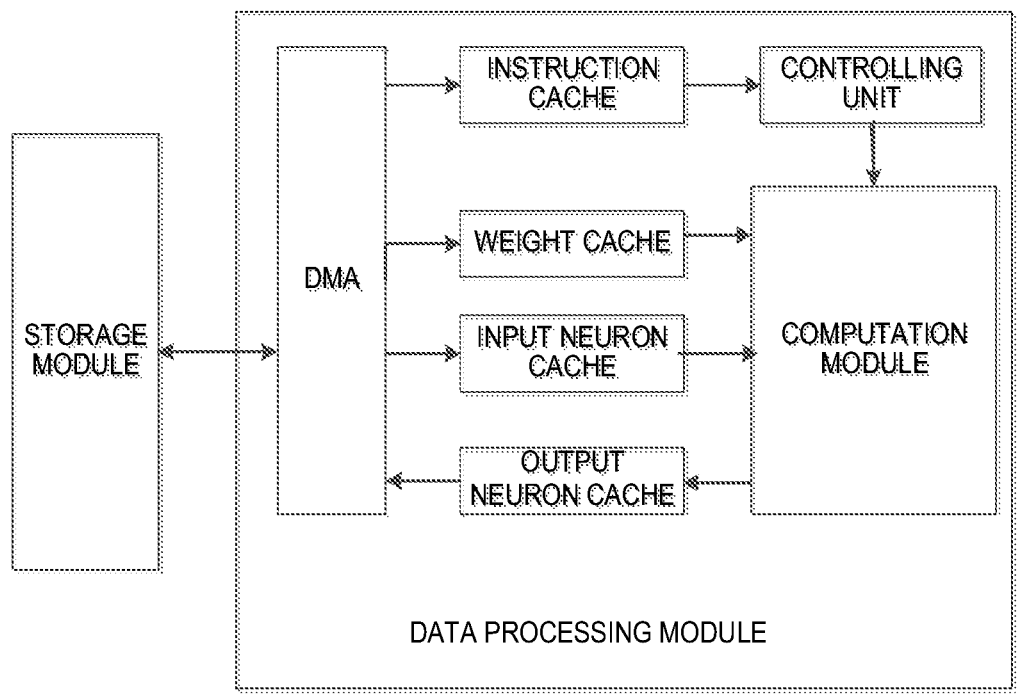
FIG. 5 is a structure diagram of an information processing device including a DMA and a controlling unit according to an embodiment of the disclosure.

FIG. 5 is a structure diagram of an information processing device including a DMA and a controlling unit according to an embodiment of the disclosure. As illustrated in FIG. 5, the data processing module of the information processing device may further include the DMA, serving as a bridge connecting the storage module with each cache and configured to read/write the data and/or instruction stored in the storage module, store the read-out/written-out instruction into the instruction cache, store read-out weights into the weight cache, store the read-out input neurons, in other words, the input data, into the input neuron cache and store the output neurons, in other words, a judgment result and/or a score, received from the output neuron cache into the storage module. The instruction cache may be configured to store the instruction cached in the DMA. The weight cache may be configured to cache the weight data cached in the DMA, and the input neuron cache may be configured to cache the input neurons cached in the DMA. Similarly, as illustrated in FIG. 5, the data processing module of the information processing device may further include the controlling unit configured to read the instruction from the instruction cache, decode the instruction acquired into an instruction executable for the computation module and output the instruction decoded to the computation module. The output neuron cache may be configured to cache the computational result, in other words, the judgment result and/or the score, output by the computation module and output it to the DMA.

Figure 6:
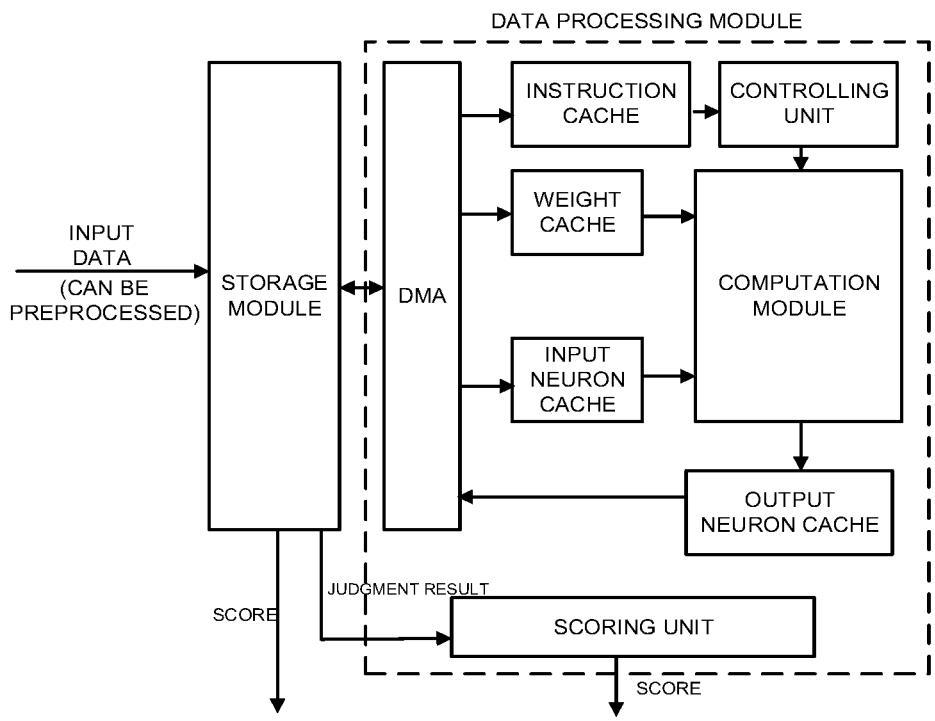
FIG. 6 is a specific structure diagram of an information processing device according to an embodiment of the disclosure.

FIG. 6 is a specific structure diagram of an information processing device according to an embodiment of the disclosure. As illustrated in FIG. 6, the data processing module may further include a scoring unit, and the scoring unit is configured as follows. If the artificial neural network running in the information processing device obtains the judgment result and further obtains the score, the unit does not participate in data processing, and if the artificial neural network running in the information processing device obtains no score but only the judgment result, the scoring unit may be configured to obtain the score according to the judgment result.

The judgment result may include value of output neurons of a final output layer of the artificial neural network running in the information processing device. The value of the output neuron is the confidence of appearance of the key features, and the confidence is a natural number within a certain range. For example, confidence within [0, 1] represents a probability of appearance of the key feature. If the confidence is binarized to be {0, 1}, 0 represents that the key feature does not appear and 1 represents that the key feature appears, or 1 represents that the key feature does not appear and 0 represents that the key feature appears. A representation manner for the confidence is not limited to the above two.

The score is obtained as follows. A layer is added after the final output layer of the artificial neural network running in the information processing device as a new final output layer. Value of input neurons of the new final output layer is confidence of appearance of key features, the layer has only one output neuron, its value is the score and weights in computation of the new final output layer correspond to importance degrees of each key feature. If the layer has N+1 output neurons, a value range of the score is [0, N]. If the output neurons of the layer are numbered to be 0, 1, 2, ..., N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i|i=0, 1, \ldots, N\}$.

The score may also be obtained as follows. After being obtained in the final output layer of the artificial neural network running in the information processing device, the confidence of appearance of each key feature may be taken as input of the scoring unit, and the scoring unit may accordingly obtain the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

The above-mentioned information processing device is an artificial neural network chip.

Figure 7:
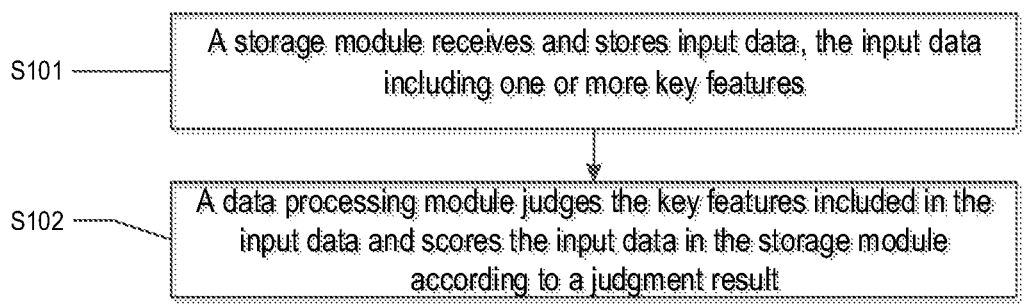
FIG. 7 is a flowchart of an information processing method for an information processing device according to an embodiment of the disclosure.

FIG. 7 is a flowchart of an information processing method for an information processing device according to an embodiment of the disclosure. The method may specifically include the following steps.

In S101, a storage module may receive and store input data, in which the input data may include one or more key features.

In S102, a data processing module may identify the key features included in the input data and score the input data in the storage module according to a judgment result. A score may be obtained by an artificial neural network running in the information processing device and may also be obtained by a scoring unit in the data processing module.

Figure 8:
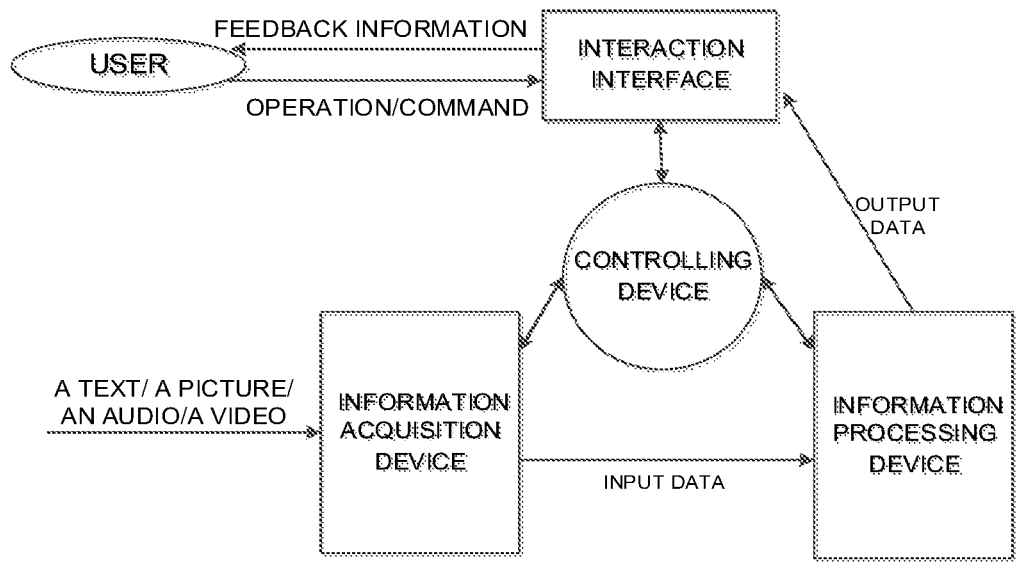
FIG. 8 is a structure diagram of an information processing system according to an embodiment of the disclosure.

FIG. 8 is a structure diagram of an information processing system according to an embodiment of the disclosure. The information processing system may include an information acquisition device, an information processing device, an interaction interface, and a controlling device.

The information acquisition device may be configured to acquire external data and transmit the external data to an information processing device.

The information processing device may be configured to perform computational processing on the external data received from the information acquisition device and output a computational processing result to an interaction interface.

The interaction interface may be configured to display the computational result received from the information processing device and transmit an externally received operation or command to a controlling device.

The controlling device may be configured to control operations of the information acquisition device, in which the information may process device and the interaction interface according to the operation or command received from the interaction interface.

The information acquisition device may be configured to acquire the external data and transmit the external data to the information processing device directly or after preprocessing, and the external data may include a text, a picture, an audio and/or a video. The information acquisition device may at least include a character recognition device, an image recognition device and a voice recognition device. The character recognition device may be configured to acquire text information in the external data, and the text information is a combination of one or more language texts and/or symbols, and the combination of the one or more language texts and/or symbols is at least an answer of test paper of a subject such as Chinese language, mathematics physics and the like. The image recognition device may be configured to acquire picture or video information in the external data, and the image recognition device is a webcam. The picture is a two-dimensional picture and/or a two-dimensional perspective, and the two-dimensional picture and/or the two-dimensional perspective are/is at least an answer of test paper of a subject such as fine arts, cartography and the like. The voice recognition device may be configured to acquire audio information in the external data, and the voice recognition device is a microphone. A preprocessing operation may make the input data more suitable to be processed by the artificial neural network to remove noise and redundancy in the input data and improve classification and recognition accuracy and the like.

The information processing device may be configured to perform computational processing on the external data or preprocessed external data received from the information acquisition device and output the computational result to the interaction interface. The information processing device in the embodiment of the disclosure is implemented by adopting an artificial neural network chip. The computational result is the judgment result or the score.

The judgment result may include value of output neurons of a final output layer of the artificial neural network running in the information processing device, in which the value of the output neuron may be confidence of appearance of the key features, and the confidence may be a natural number within a certain range. For example, confidence within [0, 1] represents a probability of appearance of the key feature. If the confidence is binarized to be {0, 1}, 0 represents that the key feature does not appear and 1 represents that the key feature appears, or 1 represents that the key feature does not appear and 0 represents that the key feature appears. A representation manner for the confidence is not limited to the above two. The score is obtained as follows. A layer is added after the final output layer of the artificial neural network running in the information processing device as a new final output layer. Value of input neurons of the new final output layer are confidence of appearance of key features. The new final neuron layer has only one output neuron, the value of the output neuron is the score and weight in computation of the new final output layer correspond to importance degrees of each key feature. If the layer has N+1 output neurons, a value range of the score is [0, N]. If the output neurons of the layer are numbered to be 0, 1, 2, ..., N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i | i=0, 1, \ldots, N\}$. The score may also be obtained as follows. After being obtained in the final output layer of the artificial neural network running in the information processing device, the confidence of appearance of each key feature is taken as input of the scoring unit, and the scoring unit accordingly obtains the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

The information processing device of the specific embodiment of the disclosure adopts the artificial neural network chip. The artificial neural network chip may perform adaptive training, and the artificial neural network chip accumulates data of a user for self-learning and may be gradually adapted to, for example, handwritings, habitual writing errors, postural characteristics and habitual movements of the user to constantly improve the accuracy and improve a movement/posture regulation capability for the user. The artificial neural network chip is of powerful computation capability, supports offline running of the neural network and may work for automatic scoring monitoring without assistance of a cloud server in computation if a user terminal/front end is offline. If the chip is online and assisted by the cloud server for computation, the computation capability of the chip is more powerful. The artificial neural network chip is adopted to automatically score a handwriting, a text and a picture instead of a worker, which is more accurate and faster than manual scoring. A subjective question may be evaluated more objectively, and influence of hobbies of a person and influence of a handwriting level of a testee are avoided.

The interaction interface may be configured to display the output result received from the information processing device and transmit the externally received operation or command to the controlling device. The user interaction interface is a display screen of a mobile phone, a computer, a notebook computer or a tablet computer.

The controlling device may be configured to control the operations of the information acquisition device, the information processing device and the interaction interface according to the operation or command received from the interaction interface.

Figure 9:
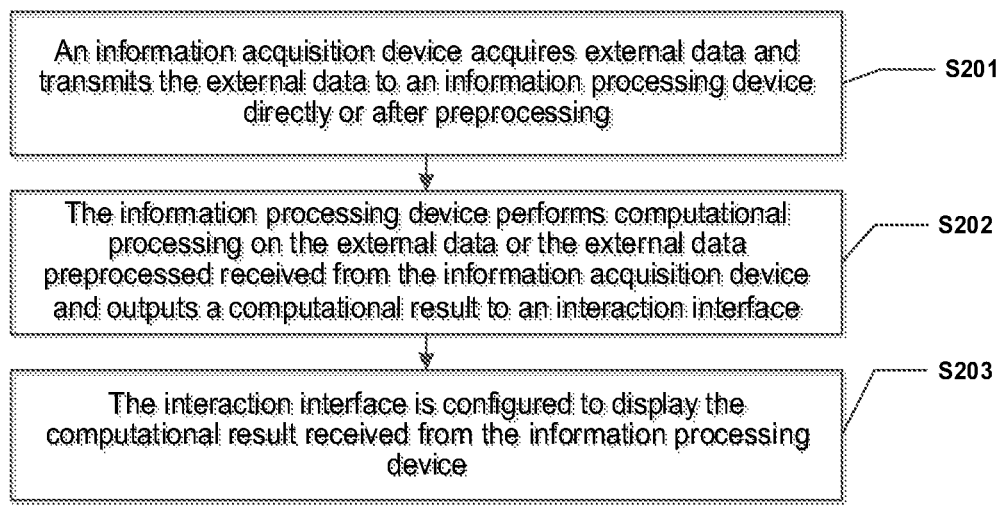
FIG. 9 is a flowchart of an information processing method for an information processing system according to an embodiment of the disclosure.

FIG. 9 is a flowchart of an information processing method for an information processing system according to an embodiment of the disclosure. As illustrated in the figure, the information processing method may include the following steps.

In S201, an information acquisition device acquires external data and transmits the external data to an information processing device directly or after preprocessing.

In S202, the information processing device may perform computational processing on the external data or the external data preprocessed received from the information acquisition device and outputs a computational result to an interaction interface.

In S203, the interaction interface may be configured to display the computational result received from the information processing device.

The information acquisition device acquires the external data and transmits the external data to the information processing device directly or after preprocessing, and the external input data may include a text, a picture, an audio and/or a video, and is preprocessed to obtain data matched with the information processing device. Preprocessing may include segmentation, Gaussian filtering, binarization, regularization, normalization or the like. Preprocessing may make the input data more suitable to be processed by an artificial neural network to remove noise and redundancy in the input data and improve classification, recognition accuracy and the like.

An artificial neural network chip may perform adaptive training, and the artificial neural network chip may accumulate data of a user for self-learning and may be gradually adapted to, for example, handwritings, habitual writing errors, postural characteristics and habitual movements of the user to constantly improve the accuracy and improve a movement/posture regulation capability for the user. The artificial neural network chip is of powerful computation capability, supports offline running of the neural network and may work for automatic scoring monitoring without assistance of a cloud server in computation if a user terminal/front end is offline. If the chip is online and assisted by the cloud server for computation, the computation capability of the chip is improved. The artificial neural network chip is adopted to automatically score a handwriting, a text and a picture instead of a worker, which is more accurate and faster than manual scoring. A subjective question may be evaluated more objectively, and influence of hobbies of a person and influence of a handwriting level of a testee are avoided.

Embodiment 1

An information processing device of the embodiment may be configured to score a group of test paper including one or more key features and acquired by a character recognition device in an information acquisition device, the key features in the test paper including keywords. Output neurons of a final output layer of an artificial neural network chip output a judgment result through computation of the artificial neural network chip, and the judgment result is confidence of appearance of the key features of the test paper, for example, confidence of appearance of the keywords. Confidence within [0, 1] represents a probability of appearance of the key feature. The probability of appearance of the keyword will be higher if the confidence is higher. If the confidence is binarized to be {0, 1}, 0 represents that the key feature does not appear and 1 represents that the key feature appears, or 1 represents that the key feature does not appear and 0 represents that the key feature appears. A representation manner for the confidence is not limited to the above two. A layer is added after the final output layer of the artificial neural network chip as a new final output layer, and value of input neurons of the new final output layer are confidence of appearances of key features.

A score may be obtained as follows. A layer is added after the final output layer of an artificial neural network running in the information processing device as a new final output layer, value of input neurons of the new final output layer is confidence of appearance of key features. The new final output layer has only one output neuron, the value of the output neuron is a score value and weights in computation of the new final output layer correspond to importance degrees of each key feature. If the layer has N+1 output neurons, a value range of the score is [0, N]. If the output neurons of the layer are numbered to be 0, 1, 2, ..., N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i | i=0, 1, \ldots, N\}$.

The score may also be obtained as follows. After being obtained in the final output layer of the artificial neural network running in the information processing device, the confidence of appearance of each key feature is taken as input of a scoring unit, and the scoring unit accordingly obtains the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

The keywords in the test paper are acquired. The keywords and the probabilities of appearance are provided through computation of the artificial neural network, so that the new final output layer is further added or the probabilities are taken as the input of the scoring unit to obtain the score of the test paper. The score is displayed on a display screen of a mobile phone, a computer, a notebook computer, a tablet computer and the like. A user may obtain the score of the test paper through the display screen.

Referring to FIG. 3, a specific processing process for the keywords in the artificial neural network chip is as follows.

In step 1, the external data acquired by the character recognition device, image recognition device and voice recognition device in the information acquisition device is transmitted into a storage module of the artificial neural network chip after preprocessing or directly. After the external data is preprocessed, the external data may be more suitable to be processed by an artificial neural network to remove noise and redundancy in the input data and improve classification and recognition accuracy and the like.

In step 2, a DMA transmits the data in the storage module into corresponding on-chip caches (for example, an instruction cache, an input neuron cache and a weight cache) in batches. In the artificial neural network chip, the dedicated on-chip caches (for example, the instruction cache, the input neuron cache, an output neuron cache and the weight cache) and a dedicated artificial neural network computational instruction and a memory access instruction are adopted, so that computational and memory access efficiency may be effectively improved.

In step 3, a controlling unit reads an instruction from the instruction cache and decodes and transmits the instruction decoded into a computation module.

In step 4, the computation module may perform corresponding computation according to the instruction. In each layer of the neural network, computation performed by the computation module may include, but is not limited to a first part including a multiplier, a second part including one or more adders (more specifically, the adders of the second part form an adder tree), a third part including an activation function unit and/or a fourth part including a vector processing unit. More specifically, the vector processing unit may process vector computation and/or pooling computation. The first part multiplies input data 1 (in1) and input data 2 (in2) to obtain multiplied output (out), and a process is represented with out in1×in2. The second part adds the input data in1 through the adders to obtain output data (out). More specifically, if the second part is the adder tree, the input data in1 is added step by step through the adder tree to obtain the output data (out). Data In1 is a vector with a length N, and N is greater than 1. A process is represented with out=in1[1]+in1[2]+ ... +in1[N] and/or the input data 1 (in1) is accumulated through the adder tree and then is added with the input data 2 (in2) to obtain the output data (out). A process is represented with out=in1[1]+in1[2]+ ... +in1[N]+in2. Alternatively, the input data 1 (in1) and the input data 2 (in2) are added to obtain the output data (out), and a process is represented with out=in1+in2. The third part may perform computation on the input data (in) through an activation function to obtain active output data (out), and a process is represented with out=active(in). The activation function may be sigmoid, tan h, relu, softmax and the like. Besides an activation operation, the third part may implement another nonlinear function and may perform computation (f) on the input data (in) to obtain the output data (out), and a process is represented with out f(in). The vector processing unit may perform the pooling computation on the input data (in) to obtain output data (out) after a pooling operation, and a process is represented with out=pool(in). Pool is the pooling operation, and the pooling operation may include, but is not limited to AVGPOOLING, MAXPOOLING and median pooling. The input data (in) is data in a pooling core related to output out. The computation of one or more parts of the above-mentioned parts may be freely selected for combination in different sequences, thereby implementing computation of various functions.

In the artificial neural network chip, multiple groups of weights and input neurons may be concurrently processed by the adder tree computation adopted by the computation module, so that the computational efficiency can be improved.

In step 5, step 2 to step 4 are repeated until computation for all the data in the storage module is completed, for example, obtaining a final result required by a function. The final result is obtained by the output neurons of the final layer of the neural network, is output from the computation module to the output neuron cache and is returned to the storage module through the DMA.

According to the requirement of the function, if the judgment result is required to be obtained, value of the output neuron of the final layer of the neural network is the confidence of appearance of the keywords. The final layer has only one output neuron, the value of the output neuron is the score of the test paper, and the weights in the computation of the new final output layer correspond to the importance degrees of each key feature. If the layer has N+1 output neurons, a value range of the score is [0, N]. If the output neurons of the layer are numbered to be 0, 1, 2, ..., N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i | i=0, 1, \ldots, N\}$. The highest score value is the score of the test paper.

The score may also be obtained as follows. After being obtained in the final output layer of the artificial neural network running in the information processing device, the confidence of appearance of each key feature is taken as input of the scoring unit, and the scoring unit accordingly obtains the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

Embodiment 2

An information processing device of the embodiment may be configured to score a video, in which the video may be a group of pictures including one or more key features. A storage module in an artificial neural network chip pre-stores one or more key pictures. The storage module acquires the video from the outside and transmits it to a computation module. Output neurons of a final output layer of the artificial neural network chip output a judgment result through computation of the artificial neural network chip, and the judgment result may include a similarity between each input picture and each key picture. To be more specific, if there are N input pictures and M key pictures, N×M similarities are obtained. In the embodiment, the similarities is confidence, and the confidence is a natural number within a certain range. Confidence within [0, 1] represents a probability of appearance of the key feature. If the confidence is binarized to be {0, 1}, 0 represents that the key feature does not appear and 1 represents that the key feature appears, or 1 represents that the key feature does not appear and 0 represents that the key feature appears. A representation manner for the confidence is not limited to the above two.

A layer is added after the final output layer of the artificial neural network chip as a new final output layer, and value of input neurons of the new final output layer are confidence of appearance of each key feature. The confidence is the similarities between the input pictures and each key picture. If the new final output layer has only one output neuron, the value of the output neuron is a score of the video and weights in computation of the new final output layer correspond to importance degrees of each similarity. Or the layer has N+1 output neurons, a value range of the score is [0, N]. If the output neurons of the layer are numbered to be 0, 1, 2, . . . , N, a value of the $i^{th}$ output neuron corresponds to confidence $P_i$ corresponding to a score value i, and the value of a final score corresponds to highest confidence, in other words, the score=$i_0$, $P_{i_0}$=max {$P_i$|i=0, 1, . . . , N}. The score value corresponding to the highest confidence is the score of the video.

The score may also be obtained as follows. After being obtained in the final output layer of the artificial neural network running in the information processing device, the confidence of appearance of each key feature is taken as input of a scoring unit, and the scoring unit accordingly obtains the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

The score is displayed on a display screen of a mobile phone, a computer, a notebook computer, a tablet computer and the like. A user may obtain the score of the video through the display screen.

The video may further include an audio, and the audio is divided into multiple segments of audios. The multiple segments of audios correspond to multiple pictures. The chip may perform comparison to obtain similarities between all the pictures in the video and each key picture and/or may perform comparison to obtain similarities between each waveform obtained by decomposing all the audios in the video and key waveforms to score the video.

Another method for obtaining the similarities is as follows. Each output neuron of the final output layer of the neural network corresponds to an input picture, and a value of the output neuron is the similarity between the key picture most similar to the input picture and the input picture. To be kept consistent with the above example, the layer has total N output neurons.

Another method for obtaining the similarities is as follows. Each output neuron of the final output layer of the neural network corresponds to a key picture, and the value of the output neuron is the similarity between the input picture most similar to the key picture and the key picture. To be kept consistent with the above example, the layer has total M output neurons.

Referring to FIG. 3, a specific processing process for video data in the artificial neural network chip is as follows. In step 1, external data acquired by a character recognition device, an image recognition device and a voice recognition device in an information acquisition device is transmitted into the storage module of the artificial neural network chip after preprocessing or directly. A preprocessing module in the device may make the external data more suitable to be processed by an artificial neural network to remove noise and redundancy in the input data and improve classification and recognition accuracy and the like.

In step 2, a DMA transmits the data in the storage module into corresponding on-chip caches, in other words, an instruction cache, an input neuron cache and a weight cache, in batches. In the artificial neural network chip, the dedicated on-chip caches (in other words, the instruction cache, the input neuron cache, an output neuron cache and the weight cache) and a dedicated artificial neural network computational instruction and memory access instruction are adopted, so that computational and memory access efficiency may be effectively improved.

In step 3, a controlling unit reads an instruction from the instruction cache and decodes and transmits the instruction into a computation module.

In step 4, the computation module may perform corresponding computation according to the instruction in each layer of the neural network.

Computation performed by the computation module may include neural network computation.

The computation module may include, but is not limited to a first part including a multiplier, a second part including one or more adders (more specifically, the adders of the second part form an adder tree), a third part including an activation function unit, and/or a fourth part including a vector processing unit. More specifically, the vector processing unit may process vector computation and/or pooling computation. The first part multiplies input data 1 (in1) and input data 2 (in2) to obtain multiplied output (out), and a process is represented with out=in1×in2. The second part adds the input data in1 through the adders to obtain output data (out). More specifically, if the second part is the adder tree, the input data in1 is added step by step through the adder tree to obtain the output data (out). In1 is a vector with a length N, in which N may be greater than 1, and a process is represented with out=in1[1]+in1[2]+ . . . +in1[N], and/or the input data 1 (in1) is accumulated through the adder tree and then is added with the input data 2 (in2) to obtain the output data (out). A process is represented with out=in1[1]+in1[2]+ . . . +in1[N]+in2, or the input data 1 (in1) and the input data 2 (in2) are added to obtain the output data (out), and a process is represented with out=in1+in2. The third part may perform computation on the input data (in) through an activation function to obtain active output data (out), and a process is represented with out=active(in), and the activation function may be sigmoid, tan h, relu, softmax and the like. Besides an activation operation, the third part may implement another nonlinear function and may perform computation (f) on the input data (in) to obtain the output data (out), and a process is represented with out=f(in). The vector processing unit may perform the pooling computation on the input data (in) to obtain output data (out) after a pooling operation, and a process is represented with out=pool(in), wherein pool is the pooling operation, the pooling operation may include, but is not limited to: AVGPOOLING, MAX-POOLING and median pooling, and the input data (in) is data in a pooling core related to output out. The computation of one or more parts of the abovementioned parts may be freely selected for combination in different sequences, thereby implementing computation of various functions.

In the artificial neural network chip, multiple groups of weights and input neurons can be concurrently processed by the adder tree computation adopted by the computation module, so that the computational efficiency can be improved.

In step 5, step 2 to step 4 are repeated until computation for all the data in the storage module is completed, for example, obtaining a final result required by a function. The final result is obtained by the output neurons of the final layer of the neural network, is output from the computation module to the output neuron cache and is returned to the storage module through the DMA.

According to the requirement of the function, if the similarity is required to be obtained, the value of the output neuron of the final layer of the neural network is a similarity value. If scoring is required, a layer is added after the final output layer as a new final output layer, and value of input neurons of the new final output layer are the similarity value. The new final output layer has only one output neuron, the value of the output neuron is the score of the video, and the weights in the computation of the new final output layer correspond to importance degrees of each similarity value. If the layer has N+1 output neurons, a value range of the score is [0, N], if the output neurons of the layer are numbered to be 0, 1, 2, . . . , N, a value of the $i^{th}$ output neuron corresponds to confidence $P_i$ corresponding to a score value i, and the value of a final score corresponds to highest confidence, in other words, the score=$i_0$, $P_{i_0}$=max $\{P_i | i=0, 1, \ldots, N\}$. The highest score value is the score of the video.

The score may also be obtained as follows. After being obtained in the final output layer of the artificial neural network running in the information processing device, the confidence of appearance of each key feature is taken as input of the scoring unit, and the scoring unit accordingly obtains the score. The scoring unit may obtain the score by multiple methods which may be a complex machine learning algorithm and may also be simple data processing. For example, the scoring unit simply averages the confidences of which value are within [0, 1] and then multiplies a result by 100 to obtain a centesimal score.

The artificial neural network chip is of powerful computation capability, supports offline running of the neural network and may work for automatic scoring monitoring without assistance of a cloud server in computation if a user terminal/front end is offline. If the chip is online and assisted by the cloud server for computation, the computation capability of the chip is more powerful. The artificial neural network chip automatically scores movements in the pictures in the video instead a worker, which is more accurate and faster than manual scoring. A subjective question may be evaluated more objectively, and influence of hobbies of a person is avoided. According to the device and method of the embodiment, the movements/postures of the user are monitored instantly, a prompt is automatically and instantly given to regulate the movements/postures of the user, and the method and the device work for training and monitoring instead of the worker, and are more accurate and instant than the worker.

The artificial neural network chip may perform adaptive training, and the chip accumulates data of the user for self-learning and may be gradually adapted to, for example, handwritings, habitual writing errors, postural characteristics and habitual movements of the user to constantly improve the accuracy and improve a movement/posture regulation capability for the user.

All of the modules in the embodiment of the disclosure may be hardware structures. Physical implementations of the hardware structures may include, but are not limited to, physical devices, and the physical devices may include, but are not limited to, transistors, memristors and Deoxyribonucleic Acid (DNA) computers.

The electronic equipment may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance and/or medical equipment.

The transportation means may include an airplane, a ship and/or a vehicle; the household electrical appliance may include a television, an air conditioner, a microwave oven, a refrigerator, an electric rice cooker, a humidifier, a washing machine, an electric lamp, a gas cooker and a range hood; and the medical equipment may include a nuclear magnetic resonance spectrometer, a B-ultrasonic scanner and/or an electrocardiograph.

Each functional unit/module/submodule/subunit in the disclosure may be hardware. For example, the hardware may be a circuit, including a digital circuit, an analogue circuit and the like. Physical implementation of a hardware structure may include, but is not limited to, a physical device, and the physical device may include, but not limited to, a transistor, a memristor and the like. The computing module in the computation device may be any proper hardware processor, for example, a CPU, a GPU, an FPGA, a DSP and an ASIC. The storage unit may also be any proper magnetic storage medium or magneto-optical storage medium, for example, an RRAM, a DRAM, an SRAM, an EDRAM, an HBM and an HMC.

Those skilled in the art may clearly know that, for convenient and brief description, descriptions are only made with division of each of the abovementioned functional modules as an example and the abovementioned functions may be allocated to different functional modules for realization according to a requirement during a practical application, in other words, an internal structure of the device is divided into different functional modules to realize all or part of the functions described above.

The purposes, technical solutions and beneficial effects of the disclosure are further described above with the specific embodiments in detail. It should be understood that the above is only the specific embodiment of the disclosure and not intended to limit the disclosure. Any modifications, equivalent replacements, improvements and the like made within the spirit and principle of the disclosure shall fall within the scope of protection of the disclosure.

What is claimed:

1. An information processing device, comprising:
a storage module configured to receive and store input data and one or more instructions; and
a data processing module configured to:
identify one or more key features included in the input data to generate a judgment result, and
score the input data in the storage module according to the judgment result,
wherein the storage module stores data and one or more instructions,
wherein the data includes the input data, input neurons, weights, output neurons,
wherein the input data is transmitted to each input node in an artificial neural network for subsequent computation,
wherein values of the output neurons include the judgment result and a score and
wherein the judgment result and the score are determined as output data and
wherein the data processing module includes a computation module configured to perform corresponding computation on the data stored in the storage module according to the one or more instructions stored in the storage module and output a computational result to the storage module,
wherein in each layer of the neural network, the computation module includes:
one or more multipliers configured to multiply the input data with the weights;
one or more adders configured to:
add one or more multiplication results to generate an addition result, and
determine whether to add a bias value to the addition result; and
an activation function unit configured to perform an activation function to the addition result to generate the output neurons.

2. The information processing device of claim 1, wherein the input data is original input data or preprocessed data obtained by preprocessing the original input data.

3. The information processing device of claim 1, wherein the data processing module is configured to compute confidence of the key features included in the input data, and wherein the confidence is the judgment result.

4. The information processing device of claim 1, wherein the data processing module further includes:
an instruction cache configured to cache the one or more instructions; and
a neural network data cache configured to cache the weights, the input neurons and the output neurons.

5. The information processing device of claim 4,
wherein the data processing module further includes a Direct Memory Access (DMA) serving as a bridge which connects the storage module with each cache and configured to:
access the data and instruction stored in the storage module,
store a read-out/written-out instruction into the instruction cache,
store read-out weights into the weight cache,
store the input data in the input neuron cache, and
store the judgment result and/or the score received from the output neuron cache into the storage module,
wherein the data processing module further includes a controlling unit configured to:
read the instruction from the instruction cache,
decode the instruction into an instruction executable for the computation module, and
output the instruction to the computation module.

6. The information processing device of claim 4, wherein the data processing module further includes a scoring unit configured to obtain the score according to the judgment result if the artificial neural network running in the information processing device obtains no score but only the judgment result.

7. The information processing device of claim 6, wherein the judgment results are value of output neurons of a final output layer of the artificial neural network running in the information processing device, the value of the output neuron is the confidence that the key features appear, and the confidence is a natural number within a certain range.

8. The information processing device of claim 7, wherein the score is obtained by:
adding a layer after the final output layer of the artificial neural network running in the information processing device as a new final output layer, where the values of input neurons of the new final output layer are confidences that the key features appear, and the new final output layer has only one output neuron, the value of the output neuron is the score; where weights in computation of the new final output layer correspond to importance degrees of each key feature, if the layer has N+1 output neurons, a value range of the score is [0, N], if the output neurons of the layer are numbered to be 0, 1, 2, . . . , N a value of the $i^{th}$ output neuron is confidence $P_i$ corresponding to a score value i, and the value of a final score corresponds to the highest confidence, in other words, the score=$i_0$, $P_{i_0}$=max $\{P_i|i=0, 1, \ldots, N\}$.

9. The information processing device of claim 7, wherein the score is obtained by:
taking the confidence that each key feature appears as input of the scoring unit, after each key feature is obtained in the final output layer of the artificial neural network running in the information processing device, and obtaining, by the scoring unit, the score accordingly.

10. A method for information processing, comprising:
receiving, by a storage module, input data and one or more instructions; and
identifying, by a data processing module, one or more key features included in the input data to generate a judgment result,
storing, by the storage module, data and one or more instructions, wherein the data includes the input data, input neurons, weights, output neurons;
transmitting the input data to each input node in an artificial neural network for subsequent computation, wherein values of the output neurons include the judgment result and a score, wherein the judgment result and the score are determined as output data;
performing, by a computation module of the data processing module, corresponding computation on the data stored in the storage module according to the one or more instructions stored in the storage module and output a computational result to the storage module;

multiplying, by one or more multiplier of the computation module, the input data with the weights;

adding, by one or more adders of the computation module, one or more multiplication results to generate an addition result;

determining, by the one or more adders, whether to add a bias value to the addition result; and performing, by an activation function unit of the computation module, an activation function to the addition result to generate the output neurons.

11. The method of claim 10, wherein the input data is original input data or preprocessed data obtained by preprocessing the original input data.

12. The method of claim 10, further comprising:
computing, by the data processing module, confidence of the key features included in the input data, and wherein the confidence is the judgment result.

13. The method of claim 10, further comprising:
caching, by an instruction cache, the one or more instructions; and
caching, by a neural network data cache, the weights, the input neurons and the output neurons.

14. The method of claim 13, further comprising:
accessing, by a Direct Memory Access (DMA) serving as a bridge which connects the storage module with each cache, the data and instruction stored in the storage module;
storing, by the DMA, a read-out/written-out instruction into the instruction cache;
storing, by the DMA, read-out weights into the weight cache;
storing, by the DMA, the input data in the input neuron cache;
storing, by the DMA, the judgment result and/or the score received from the output neuron cache into the storage module;
reading, by a controlling unit, the instruction from the instruction cache;
decoding, by the controlling unit, the instruction into an instruction executable for the computation module; and
outputting, by the controlling unit, the instruction to the computation module.

15. The method of claim 13, further comprising:
obtaining, by a scoring unit, the score according to the judgment result if the artificial neural network running in the information processing device obtains no score but only the judgment result.

16. The method of claim 15, wherein the judgment results are value of output neurons of a final output layer of the artificial neural network running in the information processing device, the value of the output neuron is the confidence that the key features appear, and the confidence is a natural number within a certain range.

17. The method of claim 16, further comprising:
adding a layer after the final output layer of the artificial neural network running in the information processing device as a new final output layer, where the values of input neurons of the new final output layer are confidences that the key features appear, and the new final output layer has only one output neuron, the value of the output neuron is the score; where weights in computation of the new final output layer correspond to importance degrees of each key feature, if the layer has N+1 output neurons, a value range of the score is [0, N], if the output neurons of the layer are numbered to be 0, 1, 2, . . . , N a value of the $i^{th}$ output neuron is confidence $P_i$ corresponding to a score value i, and the value of a final score corresponds to the highest confidence, in other words, the score=$i_0$, $P_{i_0}$=max $\{P_i|i=0, 1, \ldots, N\}$.

18. The method of claim 15, further comprising;
taking the confidence that each key feature appears as input of the scoring unit, after each key feature is obtained in the final output layer of the artificial neural network running in the information processing device, and obtaining, by the scoring unit, the score accordingly.

* * * * *